United States Patent
Abouzeid et al.

(10) Patent No.: US 12,530,445 B2
(45) Date of Patent: Jan. 20, 2026

(54) MACHINE LEARNING-BASED CONFLICT MITIGATION FOR xAPPS

(71) Applicant: Dell Products L.P., Round Rock, TX (US)

(72) Inventors: Mohamed Abouzeid, Sheikh Zayed (EG); Marwan Mansour, Alexandria (EG); Abdelrahman Mohammed Seleem, Cairo (EG)

(73) Assignee: DELL PRODUCTS, L.P., Round Rock, TX (US)

( * ) Notice: Subject to any disclaimer, the term of this patent is extended or adjusted under 35 U.S.C. 154(b) by 313 days.

(21) Appl. No.: 18/347,796

(22) Filed: Jul. 6, 2023

(65) Prior Publication Data

US 2025/0013734 A1    Jan. 9, 2025

(51) Int. Cl.
*G06F 21/52* (2013.01)
*G06N 3/08* (2023.01)

(52) U.S. Cl.
CPC .............. *G06F 21/52* (2013.01); *G06N 3/08* (2013.01); *G06F 2221/033* (2013.01)

(58) Field of Classification Search
CPC ...... G06F 21/52; G06F 2221/033; G06N 3/08
See application file for complete search history.

(56) References Cited

U.S. PATENT DOCUMENTS

| | | | |
|---|---|---|---|
| 2023/0069604 A1* | 3/2023 | Subramani | G06F 9/547 |
| 2023/0246724 A1* | 8/2023 | Pateromichelakis | H04W 72/0453 370/329 |
| 2024/0098568 A1* | 3/2024 | Curic | H04W 28/0925 |
| 2024/0129799 A1* | 4/2024 | Curic | H04W 28/0925 |
| 2024/0259879 A1* | 8/2024 | Ranganath | G06N 5/01 |
| 2024/0378506 A1* | 11/2024 | D'Oro | G06N 20/00 |
| 2024/0422516 A1* | 12/2024 | Dehghan | H04W 28/16 |
| 2024/0430164 A1* | 12/2024 | Gad | H04W 24/02 |

(Continued)

FOREIGN PATENT DOCUMENTS

| | | | | |
|---|---|---|---|---|
| EP | 3962171 A1 * | 3/2022 | | H04W 36/00837 |
| GB | 2625170 A * | 6/2024 | | H04L 41/147 |

(Continued)

OTHER PUBLICATIONS

International Search Report and Written Opinion received for PCT Application Serial No. PCT/US2023/036207 dated Apr. 17, 2024, 17 pages.

(Continued)

*Primary Examiner* — Kenny S Lin
(74) *Attorney, Agent, or Firm* — Amin, Turocy & Watson, LLP

(57) ABSTRACT

Architectures and techniques are described that can provide conflict mitigation techniques for xApp that are executed on a near-realtime radio access network intelligent controller (near-RT RIC). A first, deep learning machine learning model can be employed during registration of the xApps, which can identify potential conflicts and flag those potentially conflicting xApps. A second machine learning model can be employed during run time of the xApps, which can identify whether a control message from a given flagged xApp conflicts with a configuration applied to an E2 node by another flagged xApp based on the current network state. Conflicts can be mitigated based on a priority between the two conflicting xApps.

20 Claims, 13 Drawing Sheets

(56) References Cited

U.S. PATENT DOCUMENTS

| | | | |
|---|---|---|---|
| 2024/0430793 A1* | 12/2024 | Hashmi | H04W 52/0203 |
| 2025/0008345 A1* | 1/2025 | Singh | H04W 24/02 |
| 2025/0008413 A1* | 1/2025 | Singh | H04W 24/02 |

FOREIGN PATENT DOCUMENTS

| | | | | |
|---|---|---|---|---|
| WO | 2023/091664 A1 | 5/2023 | | |
| WO | WO-2023213422 A1 * | 11/2023 | | H04L 41/065 |
| WO | WO-2023229503 A1 * | 11/2023 | | H04W 24/02 |

OTHER PUBLICATIONS

Adamczyk et al., "Conflict Mitigation Framework and Conflict Detection in 0-RAN Near—RT RIC", IEEE, 2023, May 11, 2023, 7 pages.

Adamczyk et al., "Detection and Mitigation of Indirect Conflicts Between xApps in Open Radio Access Networks", IEEE International Conference on Computer Communications, 2023, 2 pages.

Iturria-Rivera, et al., "Multi-Agent Team Learning in Virtualized Open Radio Access Networks (O-RAN)," Sensors 2022, 22, 5375, Published: Jul. 19, 2022, https://doi.org/10.3390/s22145375.

O-Ran Alliance, "Transforming Radio Access Networks Towards Open, Intelligent, Virtualized and Fully Interoperable RAN," https://www.o-ran.org, Retrieved from the Internet: Apr. 21, 2023.

\* cited by examiner

MACHINE LEARNING-BASED CONFLICT MITIGATION FOR xAPPS

BACKGROUND

Open Radio Access Network (O-RAN) is a promising technology that enables network operators to easily integrate different components from different vendors by suggesting new open interfaces and architectures. O-RAN introduces the intelligence of a radio access network (RAN) through a Near-Realtime RAN Intelligent Controller (Near-RT RIC) and Non-Realtime RAN Intelligent Controller (Non-RT RIC) which can enable different vendors to deploy different xApps and rApps to improve network performance in different network slices. For example, an xApp that is deployed on a Near-RT RIC can be purposed to change network configuration elements (e.g., parameters of an E2 Node) based on network metrics data or other data.

BRIEF DESCRIPTION OF THE DRAWINGS

Numerous aspects, embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figures 1A, 1B:
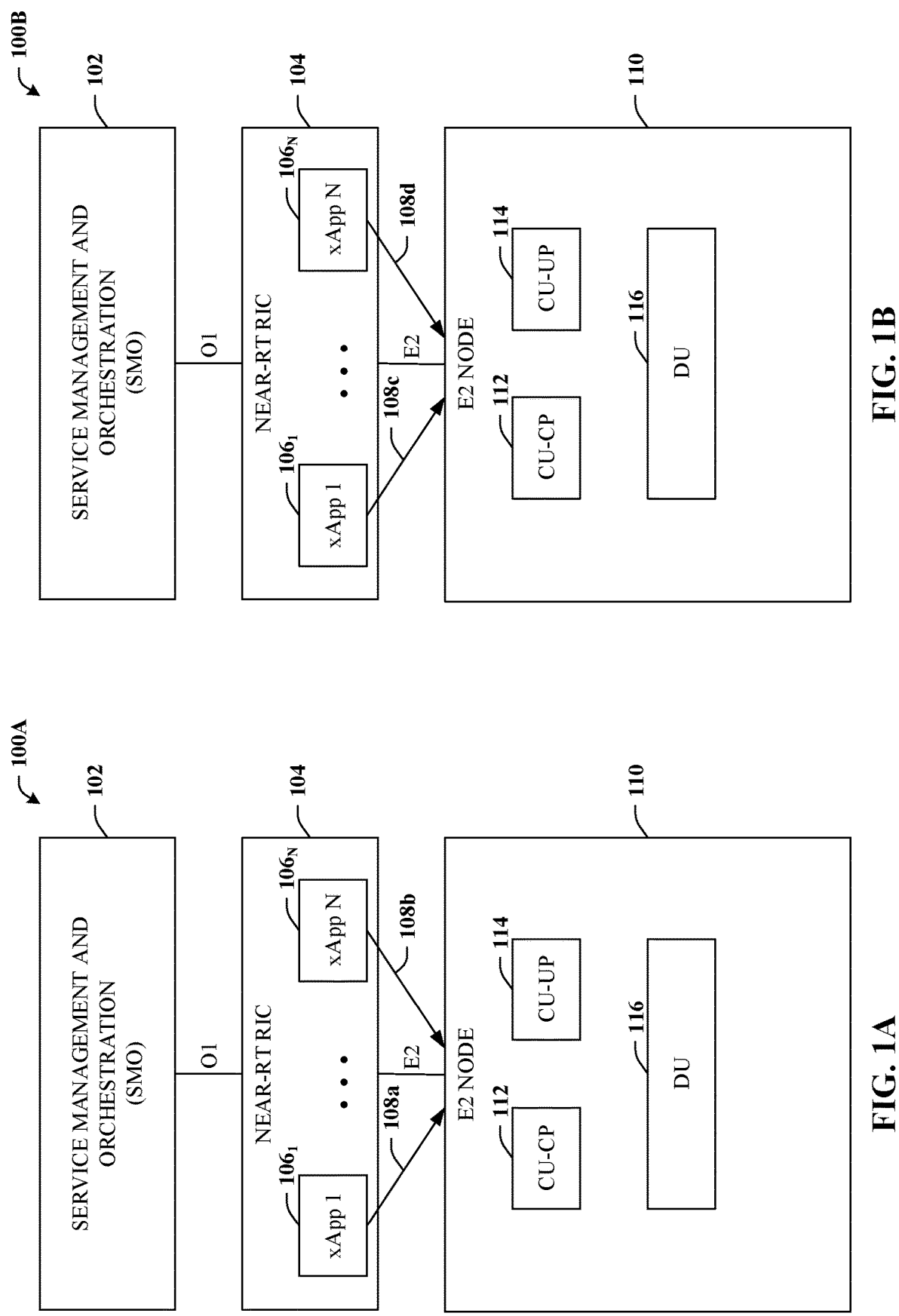
FIG. 1A depicts a schematic block diagram 100A illustrating an example direct conflict between xApps in accordance with certain embodiments of this disclosure.
FIG. 1B depicts a schematic block diagram 100B illustrating an example indirect conflict between xApps in accordance with certain embodiments of this disclosure.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

In an O-RAN deployment, the near-RT RIC can comprise many different xApps, each of which can be executed to provide some specific objective such as optimizing a specific network metric. However, since these xApps can be from different network vendors and can support different network slices, the xApps can at times attempt to apply conflicting configurations to the RAN when performing independent optimization jobs, thus potentially leading to overall network performance degradation.

Hence, in accordance with the disclosed subject matter, conflict mitigation is generally directed to addressing conflicting interactions between different xApps that execute on a near-RT RIC. During execution, an xApp will typically change one or more parameters of an E2 node with the objective of optimizing a specific metric. Thus, conflict mitigation can be an important aspect of O-RAN deployment because, inter alia, the objectives a first xApp may be chosen/configured such that they result in conflicting actions for a second xApp.

With reference now to FIGS. 1A and 1B, FIG. 1A depicts a schematic block diagram 100A illustrating an example direct conflict between xApps in accordance with certain embodiments of this disclosure. FIG. 1B depicts a schematic block diagram 100B illustrating an example indirect conflict between xApps in accordance with certain embodiments of this disclosure.

As illustrated, service management and orchestration (SMO) 102 can communicate with near-RT RIC 104 via an O1 interface. SMO 102 can operate as a management and orchestration layer that controls configuration and automation aspects of RIC and RAN elements.

Near-RT RIC 104 can comprise various xApps 106, illustrated here as xApps $106_1$-$106_N$, where N can be any whole number. Near-RT RIC 104 can communicate with E2 node 110 via an E2 interface. In some embodiments, E2 node 110 can represent a RAN portion of the network architecture. Such can include one or more centralized unit (CU), including a centralized unit control plane (CU-CP) 112 and a centralized unit user plane (CU-UP) 114. E2 node 110 can further comprise one or more distributed unit (DU) 116, as understood in the art. Thus, workloads of the xApps 106 are executed by Near-RT RIC 104, typically using data collected from the RAN portion of the network (e.g., E2 node 110). In response, control messages 108 can be delivered to E2 node 110 based on the data collected in order to improve or otherwise reconfigure an element of E2 node 110.

A given control message can therefore represent an action 108 to take on E2 node 110, typically instructing E2 node 110 to modify some parameter or other configuration or setting. As indicated a conflict can arise when an action 108a suggested by a first xApp 106$_1$ conflicts with (e.g., degrades or interferes with) objectives of a configuration suggested for action 108b of a different xApp106$_N$. In that regard, there are several potential types of conflicts, two of which are illustrated here. Namely, diagram 100A illustrates a direct conflict, while diagram 100B illustrates an indirect conflict.

Direct conflicts can be observed directly. An example of a direct conflict can occur when two or more xApps 106 request different settings for the same configuration of one or more parameters of a target element (e.g., an element of E2 node 110). As another example of a direct conflict can occur when a new request from an xApp 106 conflicts with the running configuration resulting from a previous request by another (or even the same) xApp 106.

As a concrete example, consider the case in which both action 108a and 108b are directed to changing a scheduling priority parameter of DU 116 or another element of E2 node 110. In that case, changing the scheduling priority parameter according to the control message from xApp 106$_N$ may directly conflict with the previous scheduling priority parameter value set by xApp 106$_1$ and potentially interfere with the purpose or objectives of xApp 106$_1$.

Indirect conflicts generally cannot be observed directly, but nevertheless some dependence among the parameters and resources that xApps 106 target can be observed. For instance, different xApps 106 can target different configuration parameters to optimize the same metric according to the respective xApp 106 objectives. Therefore, an indirect conflict can occur when changes requested by xApp 106$_1$ create a system impact that is equivalent to a parameter change targeted by another xApp 106$_N$.

As a concrete example, consider the case in which action 108c is directed to changing a scheduling priority parameter, while action 108d is directed to changing a measurement offset. While scheduling priority and measurement offsets are different parameters, both can impact a handover boundary and therefore cause a conflict between xApp 106$_1$ and xApp 106$_N$.

In addition, a third type of conflict can exist, namely, an implicit conflict. Generally, implicit conflicts cannot be observed directly, even the dependence between xApps are not obvious. For instance, different xApps 106 may optimize different metrics and (re-)configure different parameters. Nonetheless, optimizing one metric may have implicit, unwanted, and potentially adverse side effects on one of the metrics optimized by another xApp 106. For example, protecting throughput metrics for guaranteed bit rate (GBR) users may degrade non-GBR metrics, or even cell throughput, either of which may be managed by other xApps 106 via conflicting settings.

Previous conflict mitigation approaches have been insufficient to address the challenges that xApp conflicts presents, particularly at large scales. For example, O-RAN specifications propose different approaches for the three different types of conflicts. In that regard, it is proposed that direct conflicts typically can be mitigated by pre-action coordination, i.e., the xApps or a Conflict Mitigation component needs to make the final determination on whether any specific change is made, or in which order the changes are applied.

O-RAN proposed indirect conflicts can be resolved by post-action verification. Here, the actions are executed and the effects on the target metric are observed. Based on the observations, the system has to decide on potential corrections, e.g., rolling back one of the xApp actions.

On the other hand, implicit conflicts are the most difficult to mitigate since the relevant dependencies are difficult or impossible to observe and therefore hard to model in any mitigation scheme. In some cases, it may be possible to design around such conflicts by ensuring that use cases (e.g., xApps) target different parameters, thus falling back to the indirect conflict mitigation approach.

Another conflict mitigation technique proposes a multi-agent team learning (MATL) technique. In this solution, it is assumed there is a reinforcement learning (RL) agent for each xApp. The reinforcement learning agent is responsible for coordination with other xApps. However, by assuming that each xApp has an RL agent limits the conflict mitigation scope to only those xApps that have an RL agent. In a prospective Near-RT-RIC deployment where some xApps are third party developed, this presents a challenge to coordinate all the existing xApps from different vendors.

Moreover, using MATL will unfortunately significantly increase the communication overhead between near-RT RIC components and xApps, e.g., in the case of sequential communication, and at a large scale of xApps. Such can eventually decrease the performance of the near-RT RIC. Furthermore, the MATL approach considers all xApps' actions on the near-RT RIC, including xApps that aren't potentially conflicting, which can significantly increase overall near-RT RIC complexity.

In order to provide robust conflict mitigation, the disclosed subject matter is directed in some embodiments to introducing concepts of intelligent detection of conflicts and mitigating those conflicts by relying on two machine learning models. Such can operate to avoid conflicting actions between xApps. The disclosed techniques propose the addition of three devices, components, or modules to the near-RT RIC. These three elements are referred to herein as a conflict predictor, a conflict detector, and a conflict mitigator, which are further detailed in connection with FIG. 2 and subsequent figures.

Example Systems

Figure 2:
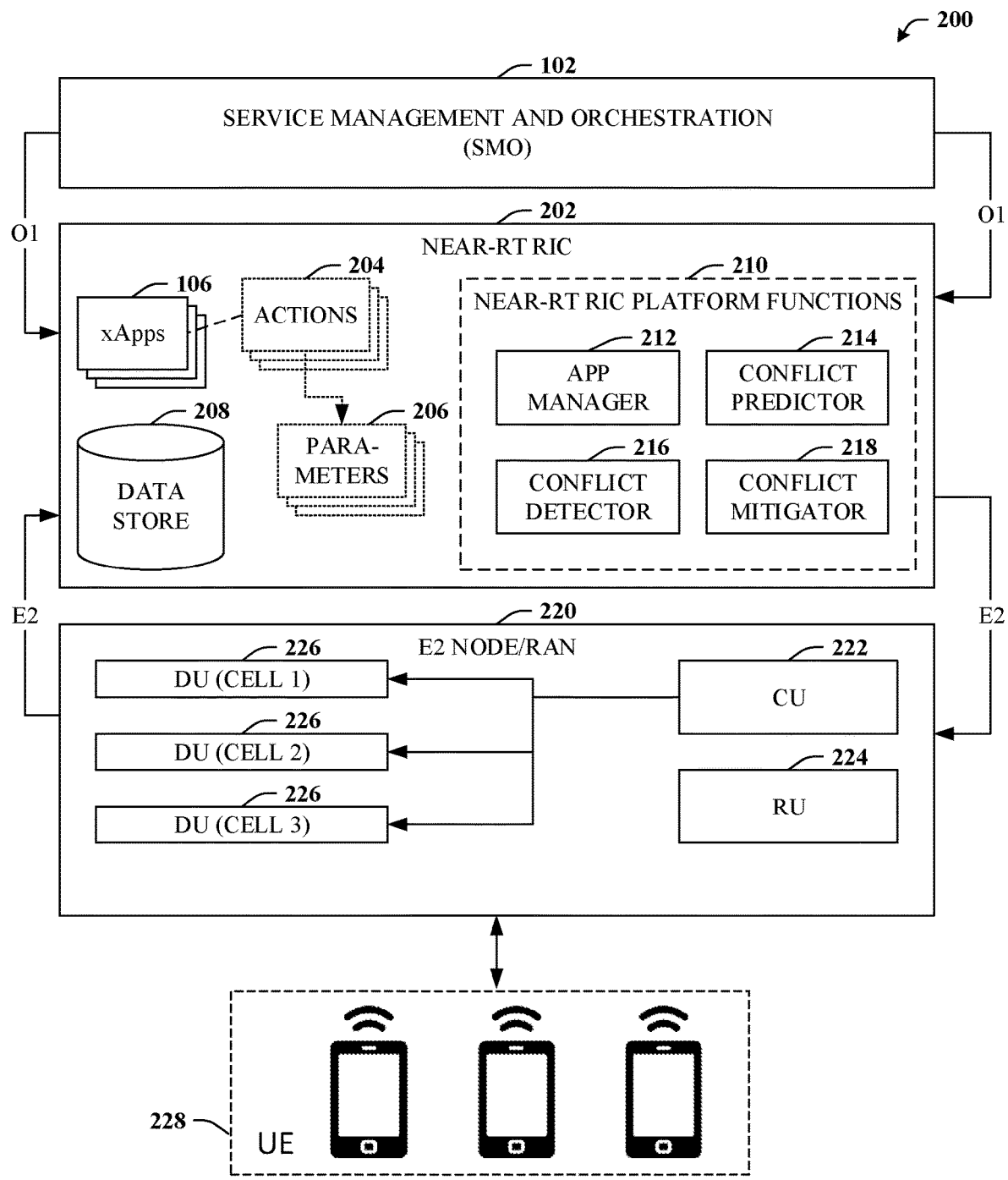
FIG. 2 depicts a schematic block diagram illustrating an example system 200 that can utilize machine learning techniques to mitigate control action conflicts that arise between xApps executing on a near-RT RIC in accordance with certain embodiments of this disclosure.

Referring now to FIG. 2, a schematic block diagram is depicted illustrating an example system 200 that can utilize machine learning techniques to mitigate control action conflicts that arise between xApps executing on a near-RT RIC in accordance with certain embodiments of this disclosure. For example, near-RT RIC 202 can comprise xApps 106, as detailed in connection with near-RT RIC 104 of FIGS. 1A and 1B. Each xApp 106 can be programmed to apply one or more actions 204 (e.g., via control messages transmitted over an E2 interface) that affect one or more parameters 206 of an E2 node 220.

As mentioned, E2 node 220 can represent elements of a RAN portion such as CU 222, DU 226, or RU 224. As illustrated, elements of E2 node 220 can serve a group of user equipment (UE) 228. Service of UE 228 can be optimized or improved by operation of xApps 106.

In addition to xApps 106, near-RT RIC 202 can comprise data store 208. Data store 208 can represent a local store for a given near-RT RIC 202. Typically, data store 208 can be configured to store key performance indicator (KPI) and other network metrics as well as control actions (e.g., actions 204) that were executed or applied to E2 node 220 within a session.

Near-RT RIC 202 can comprise certain platform functions 210. One example is app manager 212. Generally, app manager 212 is responsible for handling registration and other management operations relating to xApps 106. In accordance with the disclosed subject matter, near-RT RIC 202 can further comprise conflict predictor 214, conflict detector 216, and conflict mitigator 218, which can be implemented or exposed as part of platform functions 210, as shown here, or as another suitable portion of near-RT RIC 202.

Conflict predictor 214 can utilize machine learning (ML) techniques to predict potential conflicts, which can be performed during xApp registration (e.g., at registration time) and can therefore function in combination with app manager 212. Generally, conflict predictor 214 can flag potential conflicts based on specific details of a new xApp that is being registered. Associated flag data can be subsequently used (e.g., during run time of xApps 106) to determine whether control actions from an xApp 106 require conflict verification.

Since the prediction model can run at registration time, the prediction model can be aware of all previously registered xApps 106 and the actions 204 executed by all registered xApps 106 and the parameters 206 thereby controlled by those actions 204. Operation of conflict predictor 214 can be O-RAN compliant and, because such can be performed during registration, subsequent detection of conflicts can be less resource-intensive and improve response times or other metrics of xApps 106 without conflicts. Additional detail relating to conflict predictor 214 is provided with reference to FIG. 3.

Conflict detector 216 can utilize machine learning techniques to identify actual conflicts based on the existing network state during run time. For example, when a given xApp 106 initiates a new control action 204, provided that that xApp 106 was previously flagged by conflict predictor 214, conflict detector 216 can evaluate the new control action 204 against other actions 204 (e.g., from any xApp 106) that are already in effect on E2 node 220.

For instance, conflict detector 216 can take as input the new control action 204 and a list of all the actions that are currently in effect on E2 node 220 that could potentially cause conflicts. The output of the ML detection model can be a hot encoded list representing actions 204 that are conflicting with the new action 204. It is appreciated that the first ML model (e.g., ML prediction model used by conflict predictor 214) and the second ML model (e.g., ML detection model used by conflict detector 216) can be different ML models, can be similar models, or even the same ML model. Likewise, the first ML model and the second ML model can be trained on the same or different datasets. However, it is noted that the first ML model can execute at registration time such that candidate conflicts can be identified, whereas the second ML model can execute at run time and can therefore generate results specifically based on the state of E2 node 220 or other network state at run time. Additional detail relating to conflict detector 216 is provided in connection with FIG. 4, below.

Conflict mitigator 218 can utilize the output of conflicted detector 216 (e.g., the hot encoded list of conflicting actions 204) and perform a priority-based conflict mitigation procedure based on individually assigned priorities of the various xApps 106 in question. Thus, conflict mitigator 218 can facilitate execution of one or the other of conflicting actions 204 based on a rules-based model designed around xApp priority. Additional detail relating to conflict mitigator 218 is provided with reference to FIG. 5.

Figure 3:
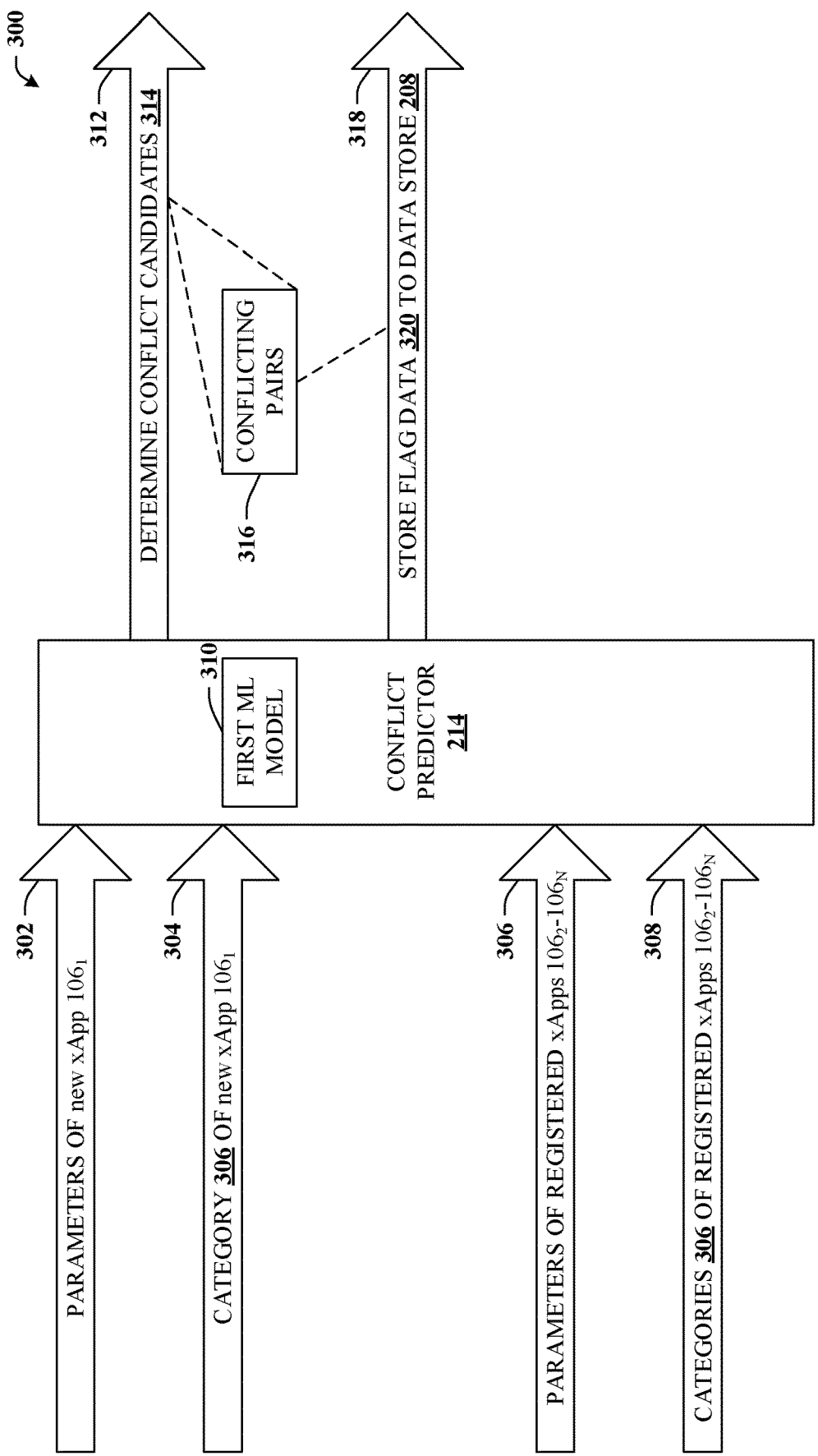
FIG. 3 depicts a schematic block diagram 300 illustrating additional aspects or elements of conflict predictor 214 in accordance with certain embodiments of this disclosure.

With reference now to FIG. 3, a schematic block diagram 300 is depicted illustrating additional aspects or elements of conflict predictor 214 in accordance with certain embodiments of this disclosure. In some embodiments, the scope of conflict predictor 214 can relate to an ability to predict, upon registration of a new xApp 106 (e.g., xApp 106₁), the probability of having a conflict with any currently registered xApp 106 (e.g., xApps 106₁-106_N) or any other registered xApp 106 (e.g., xApps 106₂-106_N).

To these and other related ends, conflict predictor 214 can comprise first ML model 310, also referred to as a ML prediction model. First ML model 310 can be a deep machine learning model that operates to predict the probability of the potential actions 204 associated with the new xApp 106 conflicting with the potential actions of all other registered xApps 106. First ML model can take into consideration all or a portion of the existing xApps 106 residing at near-RT RIC 202, including all or a portion of parameters 206 controlled by existing or registered xApps 106.

As illustrated at reference numerals 302-308, input to conflict predictor 214 can be fed into a neural network embodied as first ML model 310. Such input can include parameters 206 that are controlled by new xApp 106₁, as well as all or a portion of parameters 206 that are controlled by other xApps 106, namely, xApps 106₂-106_N. Input to conflict predictor 214 can further include category 306. At reference numeral 304, category 306 for the new xApp 106₁ can be received by conflict predictor 214. At reference numeral 308, categories 306 for the remaining set of xApps 106₂-106_N can be received. Category 306 can relate to a purpose or objective of an associated xApp 106. For example, category 306 can relate to reducing power, improving throughput or a KPI, increasing service capability, or the like.

In response to these inputs, at reference numeral 312, conflict predictor 214 can determine conflict candidates 314. Conflict candidates 314 can be indicative of new xApp 106₁ and any of the registered xApps 106 with which new xApp 106₁ might conflict. In that regard, first ML model 310 can be trained to determine a probability of having conflicts. If this probability is above a defined threshold, then the model can record that new xApp 106₁ may cause a conflict in a given parameter 206 between another registered xApp 106.

Such can be referred to as flag data 320, which can be determined by first ML model 310 and, as illustrated at reference numeral 318, stored to data store 308. Upon determination of conflict candidates 314, both new xApp 106₁ and any other conflicting xApp 106 can be identified and flagged. In some embodiments, flag data 320 can be stored to data store 208 along with conflicting pairs data 316. In other words, flag data 320 can include not only information indicating that a given xApp 106 conflicts with another xApp 106, but also information (e.g., conflicting pairs data 316) indicating which specific xApps 106 with which a given other xApp conflicts.

Figure 4:
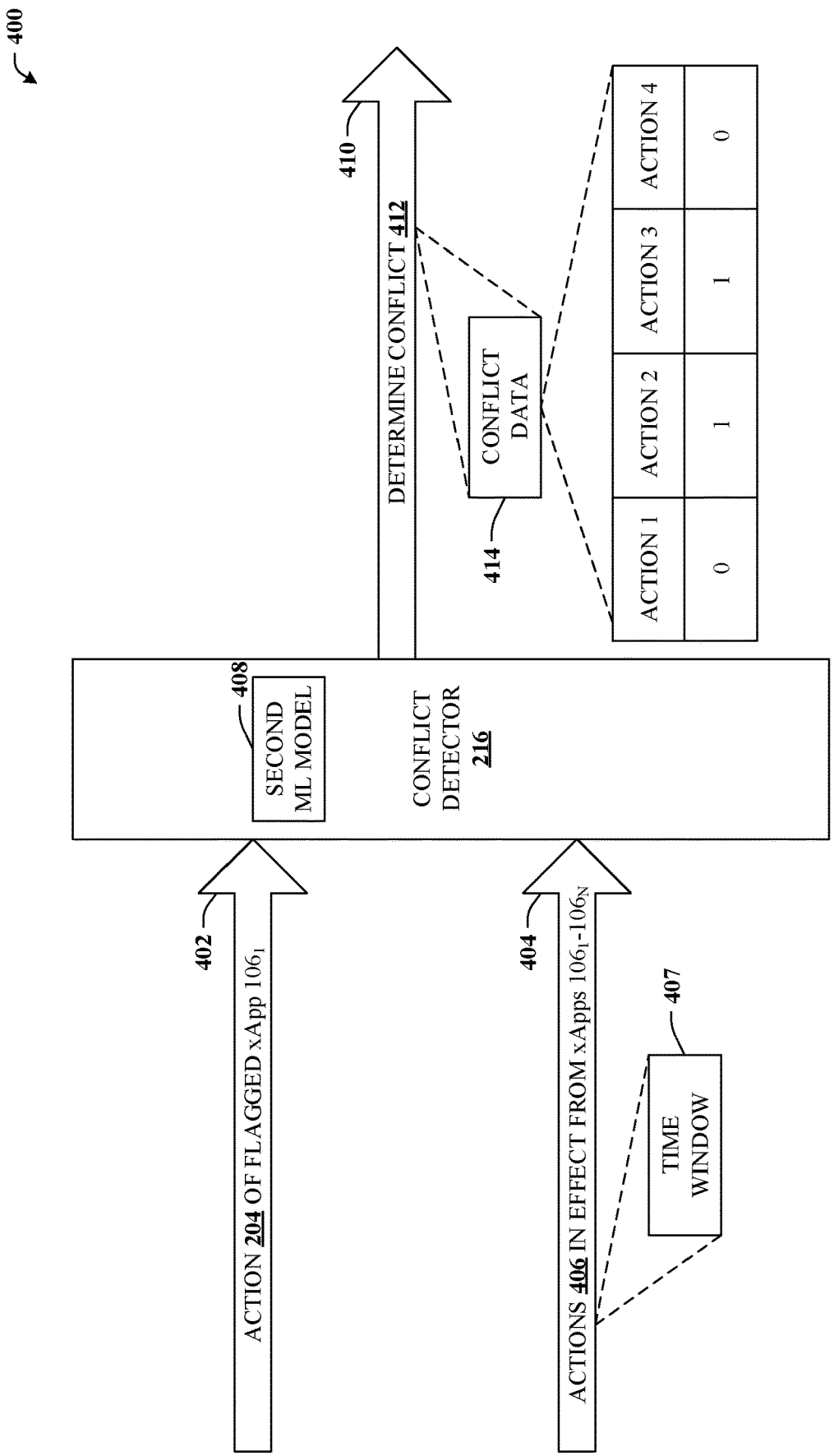
FIG. 4 illustrates a schematic block diagram 400 illustrating additional aspects or elements of conflict detector 216 in accordance with certain embodiments of this disclosure.

Turning now to FIG. 4, a schematic block diagram 400 is depicted illustrating additional aspects or elements of conflict detector 216 in accordance with certain embodiments of this disclosure. In some embodiments, the scope of conflict detector 216 can relate to detecting conflicts between a new action 204 taken by an xApp 106 and all or a portion of other actions 204 taken by any registered xApp 106. In that regard, conflict detector can employ second ML model 408, also referred to as an ML detection model 408.

Second ML model 408 can be applied for xApps 106 that were flagged by conflict predictor 214. As illustrated at reference numerals 402 and 404, conflict detector can receive as input action 204 of a flagged xApp $106_1$. Conflict detector 216 can further receive a list of actions 406, e.g., from database 208. Actions 406 can represent all or a portion of actions 204 from other xApps 106 (or even the same xApp) that are currently in effect on E2 node 220.

In some embodiments, actions 204 taken by xApps 106 can be determined to be currently in effect if those actions 204 were executed within a certain time window 407. In other words, the list of actions 406 may not include all historical actions 204 taken, but rather only those actions 204 that were taken within some recent time period that is limited by time window 407. Time window 407 can be configurable based upon the implementation or goals of the provider and, in some embodiments, can be based on a type or category 306 of a given xApp 106 or based on other suitable factors.

Hence, in some embodiments, list of actions 406 can be filtered by time window 407 (e.g., only those actions 204 that were applied to E2 node 220 within the last X time units). In some embodiments, list of actions 406 can be filtered by conflict pairs 316. For example, if flagged xApp $106_1$ submits a new action 204, then it may not be necessary to check for conflicts against all other xApps 106 that were flagged by conflict predictor 214, but rather only those xApps 106 that were flagged as potentially conflicting with xApp $106_1$. In some embodiments, second ML model 408 can run multiple times over list of actions 406, such as once for each action 204 in list of actions 406.

At reference numeral 410, conflict detector 216 can determine that one or more conflict 412 does in fact exist for the current network state. This output of the detected conflict (s) 412 can be concatenated into a one hot encoded list representing the conflicting actions which is identified as conflict data 414. In some embodiments, conflict data 414 can be formatted as a bitmap, where individual bits represent respective actions 204 taken by xApp $106_1$, and the value of each bit can indicate whether a conflict 412 was detected for the respective action 204. As an example, a value of "0" represents no conflict 412 with any other xApp 106 for the associated action 204 and a value of "1" can represent that there is a conflict 412. In some embodiments, conflict data 414 can further comprise additional data or metadata indicative of the conflicting xApp 106 in cases where conflict 412 exists.

Figure 5:
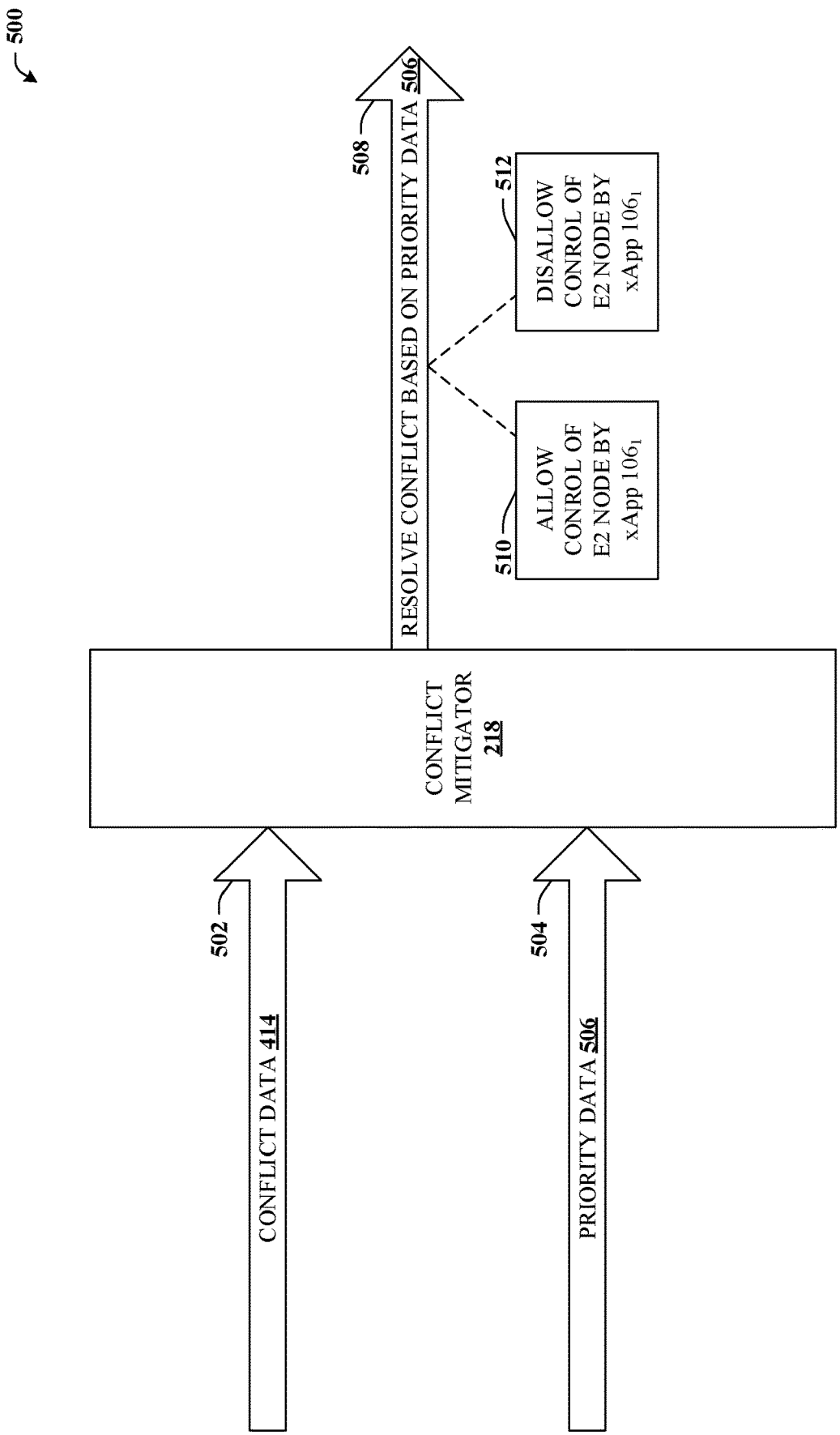
FIG. 5 depicts a schematic block diagram 500 illustrating additional aspects or elements of conflict mitigator 218 in accordance with certain embodiments of this disclosure.

Referring now to FIG. 5, a schematic block diagram 500 is depicted illustrating additional aspects or elements of conflict mitigator 218 in accordance with certain embodiments of this disclosure. Conflict mitigator 218 can be configured to indicate to the network which action 204, from among actions 204 that represent conflicts 212, should be taken. Conflict mitigator 218 can rely on a rules-based model that can receive some list of conflicting actions, such as conflict data 414 that was generated by conflict detector 216, which is illustrated at reference numeral 502.

In some embodiments, reference numeral 504, conflict mitigator 218 can receive priority data 506. Priority data 506 can represent a priority ascribed to a given xApp 106, typically during registration of that xApp 106. In other embodiments, conflict data 414 that is received by conflict mitigator 218 can be sorted according to the priority data 506, e.g., in a manner in which the xApps 106 with the highest priority is at the top and the xApp 106 with the lowest priority is at the bottom. In either embodiment, conflict mitigator 218 can determine which of the conflicting actions 204 should be given precedence based on priority data 506.

Figure 6:
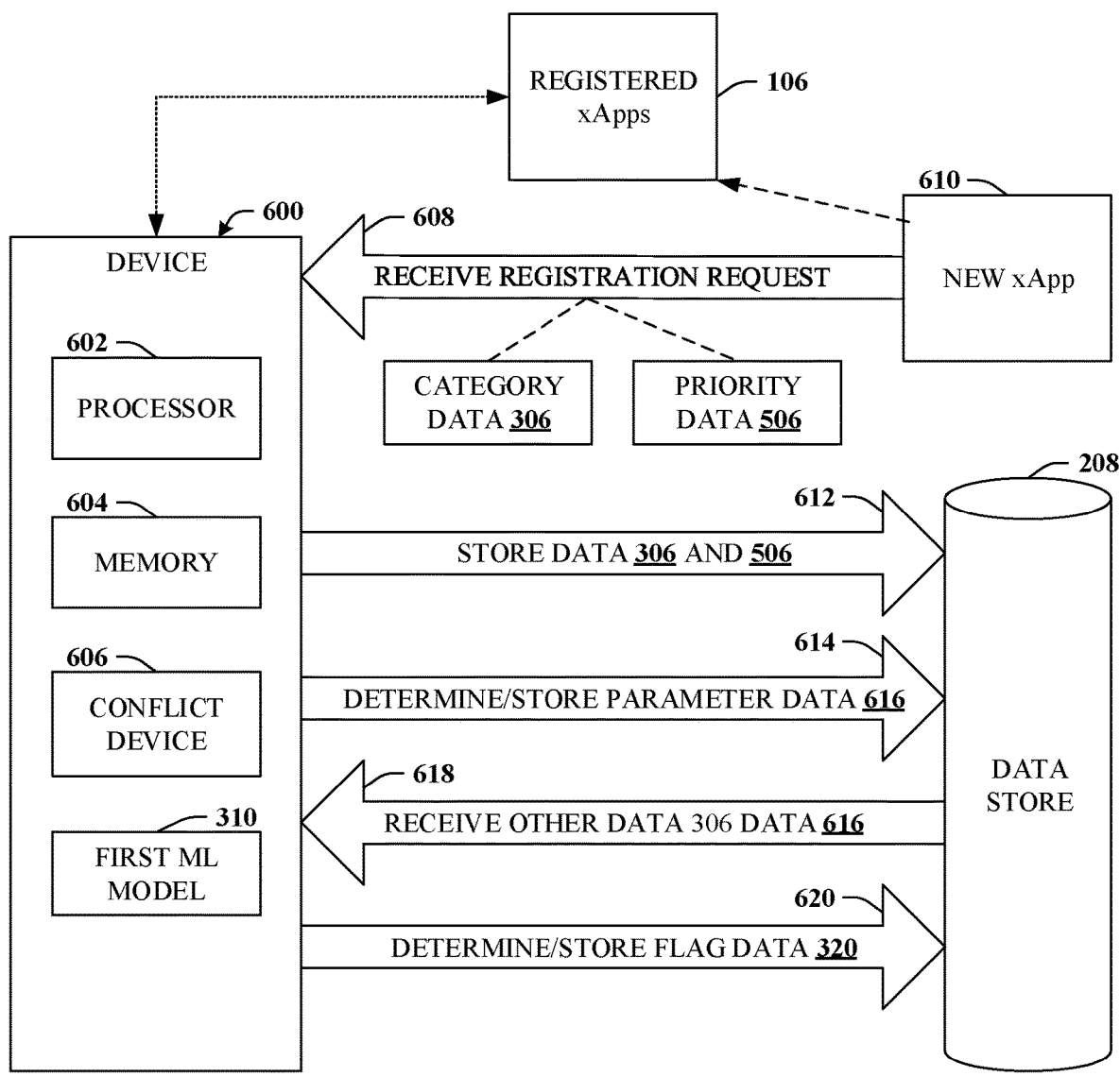
FIG. 6 depicts a schematic block diagram illustrating an example device 600 that, during registration time, can identify potential conflicts between xApps in accordance with certain embodiments of this disclosure.

With reference now to FIG. 6, a schematic block diagram is depicted illustrating an example device 600 that, during registration time, can identify potential conflicts between xApps in accordance with certain embodiments of this disclosure. In some embodiments, device 600 can be, or can be included in, a near-RT RIC such as near-RT RIC 202. Device 600 can comprise conflict device 606, which can comprise all or a portion of conflict predictor 214, conflict detector 216, conflict mitigator 218 and/or any suitable platform function 210 element. Device 700 can, in conjunction with conflict predictor 214, utilize first ML model 310, or other elements detailed herein. In some embodiments, device 600 can comprise or can be communicatively coupled to app manager 212 and/or other platform functions 210 as detailed above.

Device 600 can comprise a processor 602 that, potentially along with conflict device 606, can be specifically configured to perform functions associated with conflict mitigation. Device 600 can also comprise memory 604 that stores executable instructions that, when executed by processor 602, can facilitate performance of operations. Processor 602 can be a hardware processor having structural elements known to exist in connection with processing units or circuits, with various operations of processor 602 being represented by functional elements shown in the drawings herein that can require special-purpose instructions, for example, stored in memory 604 and/or conflict device 606. Along with these special-purpose instructions, processor 602 and/or conflict device 606 can be a special-purpose device. Further examples of the memory 604 and processor 602 can be found with reference to FIG. 13. It is to be appreciated that device 600 or computer 1302 can represent a server device or a client device of a network or network services platform and can be used in connection with implementing one or more of the systems, devices, or components shown and described in connection with FIG. 6 and other figures disclosed herein.

At reference numeral 608, device 600 can receive a registration request from new xApp 610, which is typically handled by an app manager such as app manager 212. The registration request can comprise typical registration information about new xApp 610 as well as category data 306 (e.g., indicative of a categorical type or function of new xApp 610) and priority data 506 (e.g., indicative of a priority ascribed to new xApp 610 relative to other registered xApps 106). At reference numeral 612, device 600 can store category data 306 and priority data 506 to data store 208.

At reference numeral 614, device 600 can determine parameter data 616 and store parameter data 616 to data store 208. Parameter data 618 can be indicative of all or a portion of parameters 206 that can be controlled by new xApp 610.

At reference numeral 618, device 600 can receive other category data 306 indicative of category data 306 of all or a portion of registered xApps 106 and other parameter data 616 indicative of all or a portion of parameters 206 that can be controlled by registered xApps 106. Parameter data 616 and category data 306 for both new xApp 610 and registered xApps 106 can be input to first ML model 310 in order to determine conflict candidates 314 as well as, in some embodiments, conflicting pairs 316. At reference numeral 620, resulting flag data 320 can be determined and stored to data store 208.

Figure 7:
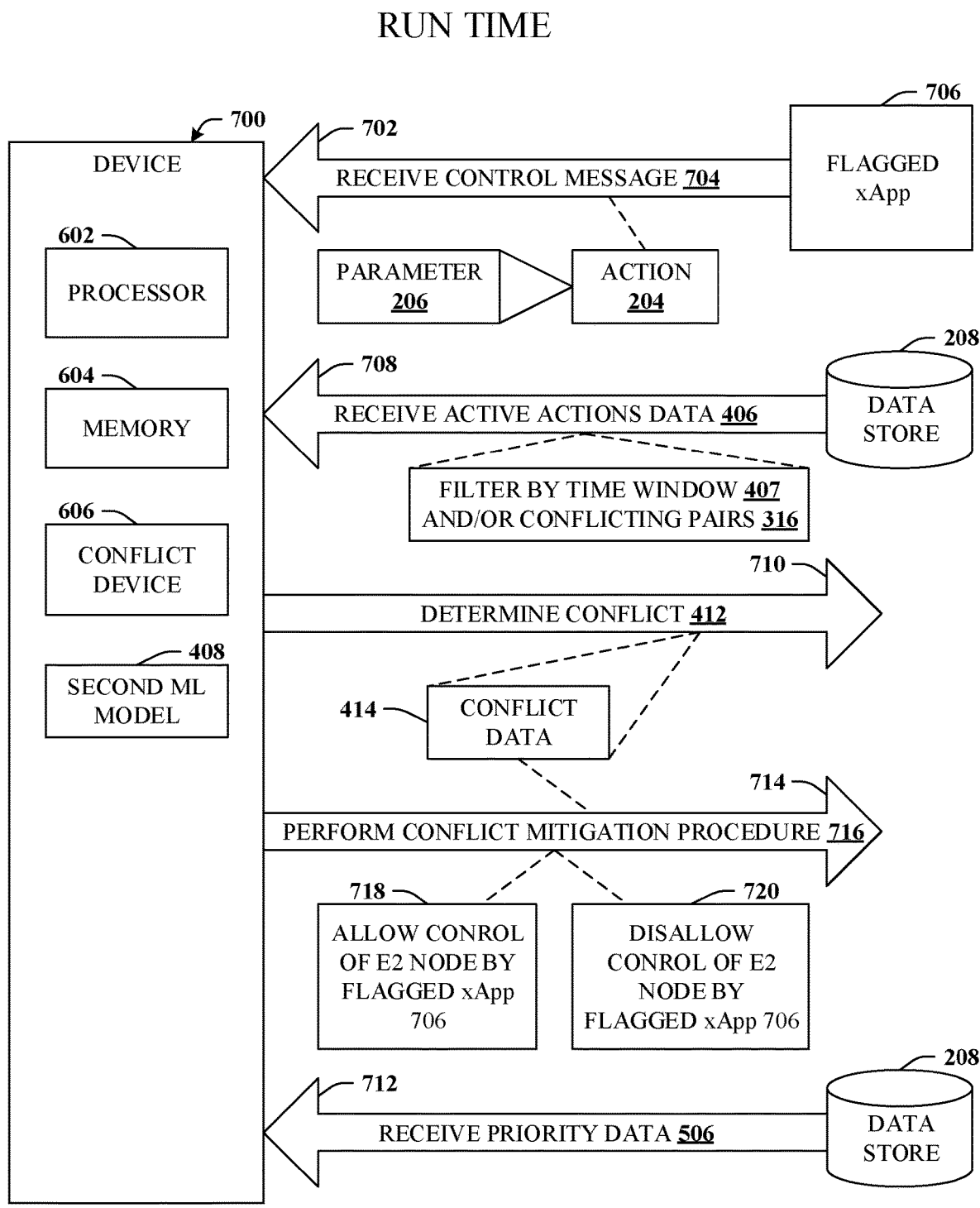
FIG. 7 depicts a schematic block diagram illustrating an example device 700 that, during run time, can determine conflicts between xApps from among the candidate conflicts in accordance with certain embodiments of this disclosure.

With reference now to FIG. 7, a schematic block diagram is depicted illustrating an example device 700 that, during run time, can determine conflicts between xApps from among the candidate conflicts in accordance with certain embodiments of this disclosure. Device 700 can comprise a processor 602 and memory 604 as detailed in connection with FIG. 6. In some embodiments, device 700 can be, or can be included in, a near-RT RIC such as near-RT RIC 202. Device 700 can comprise conflict device 606, which can comprise all or a portion of conflict predictor 214, conflict detector 216, conflict mitigator 218 and/or any suitable platform function 210 element. Device 700 can, in conjunction with conflict detector 216, utilize second ML model 408, or other elements detailed herein. It is appreciated that the first ML model 310 of device 600 (e.g., ML prediction model used by conflict predictor 214) and the second ML model 408 of device 700 (e.g., ML detection model used by conflict detector 216) can be different ML models, can be similar models, or even the same ML model. Likewise, the first ML model 310 and the second ML model 408 can be trained on the same or different datasets. However, it is noted that the first ML model 310 can execute at registration time such that candidate conflicts 314 can be identified, whereas the second ML model 408 can execute at run time and can therefore generate results specifically based on the state of E2 node 220 or other network state at run time.

At reference numeral 702, device 700 can receive control message 704 from flagged xApp 706, noting that flagged xApp 706 can be any suitable registered xApp 106 that was flagged as a conflict candidate 314 by device 600. Control message 704 can be indicative of any suitable action 204 configured to control any suitable parameter 206 of E2 node 220.

At reference 708, device 700 can receive active actions data 406, which can be a list of relevant actions that have been applied to E2 node 220 and/or are still in effect at E2 node 220. In some embodiments, active actions data 406 can be determined by filtering all actions 204 applied to E2 node 220 by one or both of time window 407 (e.g., to retrieve only the more recent actions 204 that are currently in effect on E2 node 220) or conflicting pairs 316 (e.g., to retrieve only those actions 204 implemented by registered xApps 106 that were determined to be conflict candidates 314 specifically with flagged xApp 706).

At reference numeral 710, device 700 can determine conflict 412 exists based on a current state of the network, as was detailed in connection with conflict detector 216 and further detailed with reference to FIG. 4. Hence, in response, device 700 can generate conflict data 414, which can be provided to conflict mitigator 218.

At reference numeral 712, device 700 can receive priority data 506 from data store 208. This priority data 506 can be specific to flagged xApp 706 and any registered xApp 106 identified by conflict data 414. In some embodiments, device 700 references priority data 506 in order to sort conflict data 414 based on priority. In other embodiments, priority data 506 can be provided to conflict mitigator 218.

At reference numeral 714, via conflict mitigator 218, device 700 can perform conflict mitigation procedure 716. In the event that flagged xApp 706 has a higher priority than an associated conflict candidate 314 then, at reference numeral 718, device 700 can allow control of E2 node 220 by flagged xApp 706. In the case where flagged xApp 706 does not have a higher priority than an associated conflict candidate 314 then, at reference numeral 720, device 700 can disallow control of E2 node 220 by flagged xApp 706 (e.g., reject control message 704 and/or prevent control message 704 from being transmitted to E2 node 220).

Figure 8:
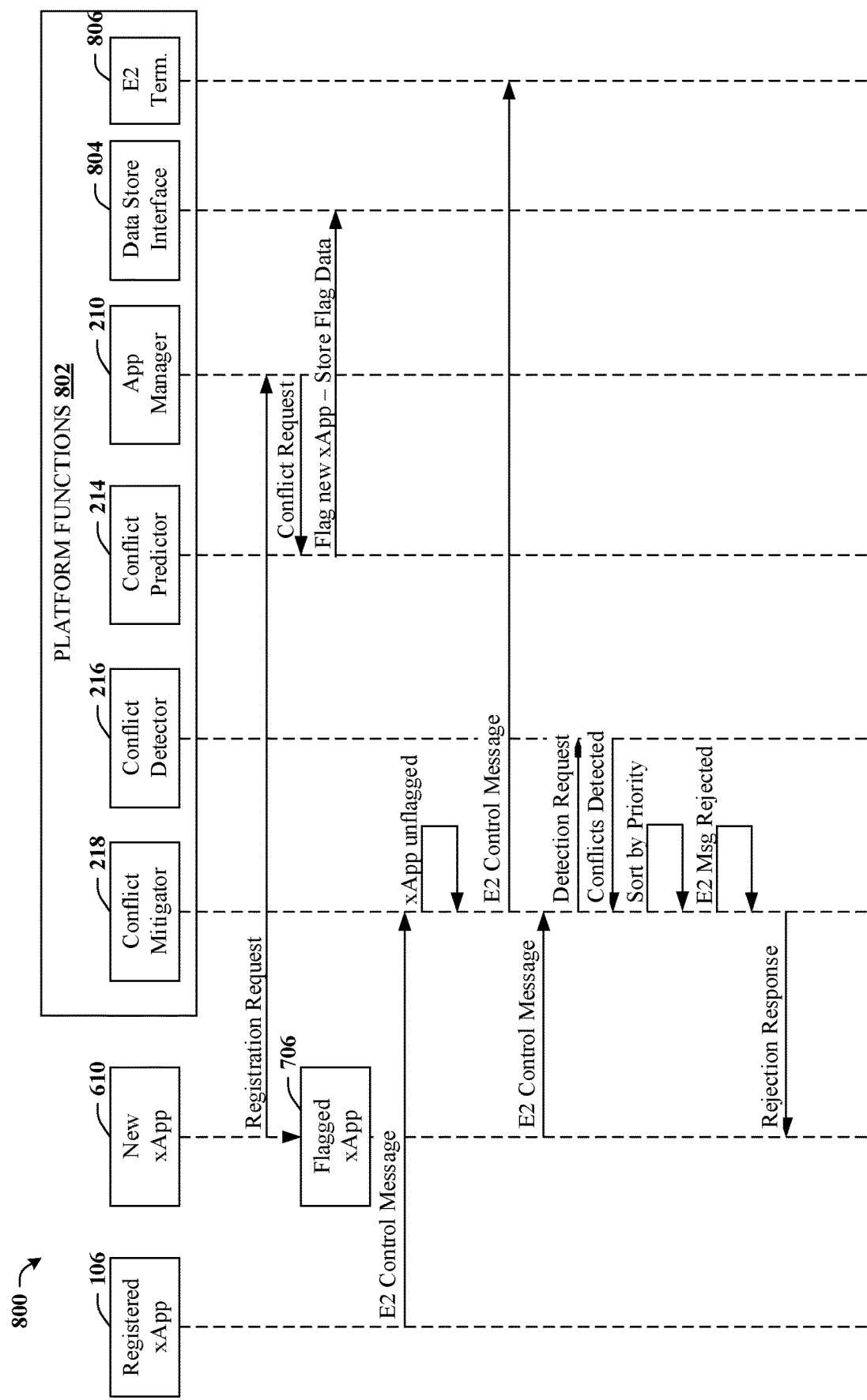
FIG. 8 depicts a call flow diagram 800 illustrating example conflict mitigation techniques in the context of call flows between xApps and platform functions 802 of a near-RT RIC in accordance with certain embodiments of this disclosure.

Referring now to FIG. 8, a call flow diagram 800 is depicted illustrating example conflict mitigation techniques in the context of call flows between xApps and platform functions 802 of a near-RT RIC in accordance with certain embodiments of this disclosure.

Initially, a new xApp 610, e.g., an xApp that is newly deployed to near-RT RIC 202, can initiate registration to near-RT RIC 202 by transmitting a registration request to app manager 210. App manager 210 initiates a conflict request to conflict predictor 214. In the case where new xApp 610 is determined to be a conflict candidate with another registered xApp 106, both xApps are flagged and flag data 320 can be stored to data store 208 (via data store interface 804) and new xApp 610 becomes flagged xApp 706.

In cases where a given xApp 106 is not flagged, then associated control messages can be processed substantially as is normally done. That is, conflict mitigator 218 can receive or intercept the control message from the registered xApp 106, determine that this xApp is unflagged and then forward the control message to E2 termination 806. E2 termination 806 can represent a platform function which is used to terminate the E2 interface and to forward/receive E2 messages to/from E2 node 220.

Alternatively, when conflict mitigator 218 receives or intercepts a control message from flagged xApp 706, conflict mitigator 218 can send a conflict detection request to conflict detector 216. Conflict detector 216 can determine conflict 412 and return conflict data 414 to conflict mitigator 218. Conflict mitigator 218 can sort conflict data 414 by priority and, provided the flagged xApp 706 does not have a higher priority, reject the control message and transmit a rejection response to flagged xApp 706.

Example Methods

Figure 9:
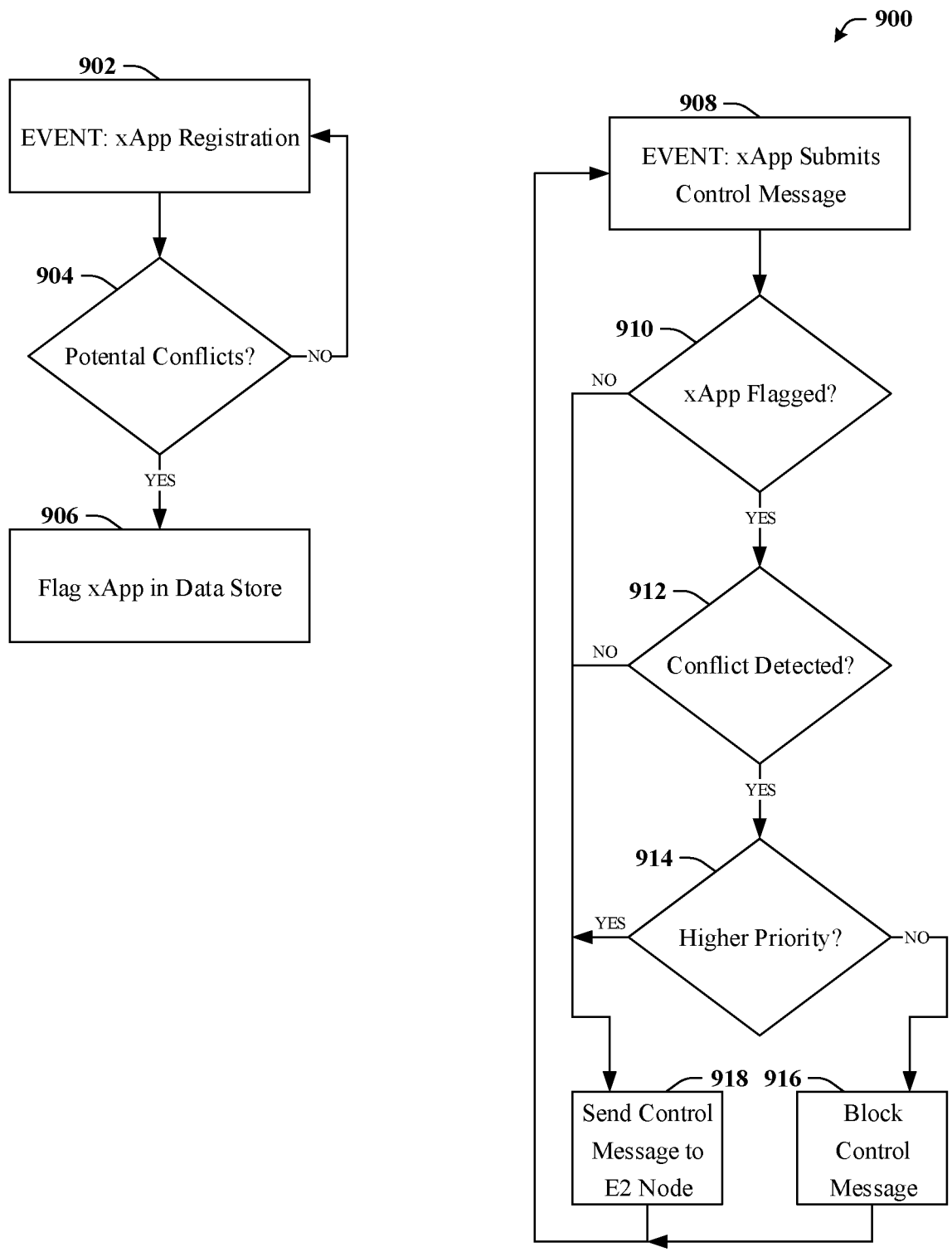
FIG. 9 illustrates an example method that can provide conflict mitigation techniques via registration time and run time functions in accordance with certain embodiments of this disclosure.
Figure 10:
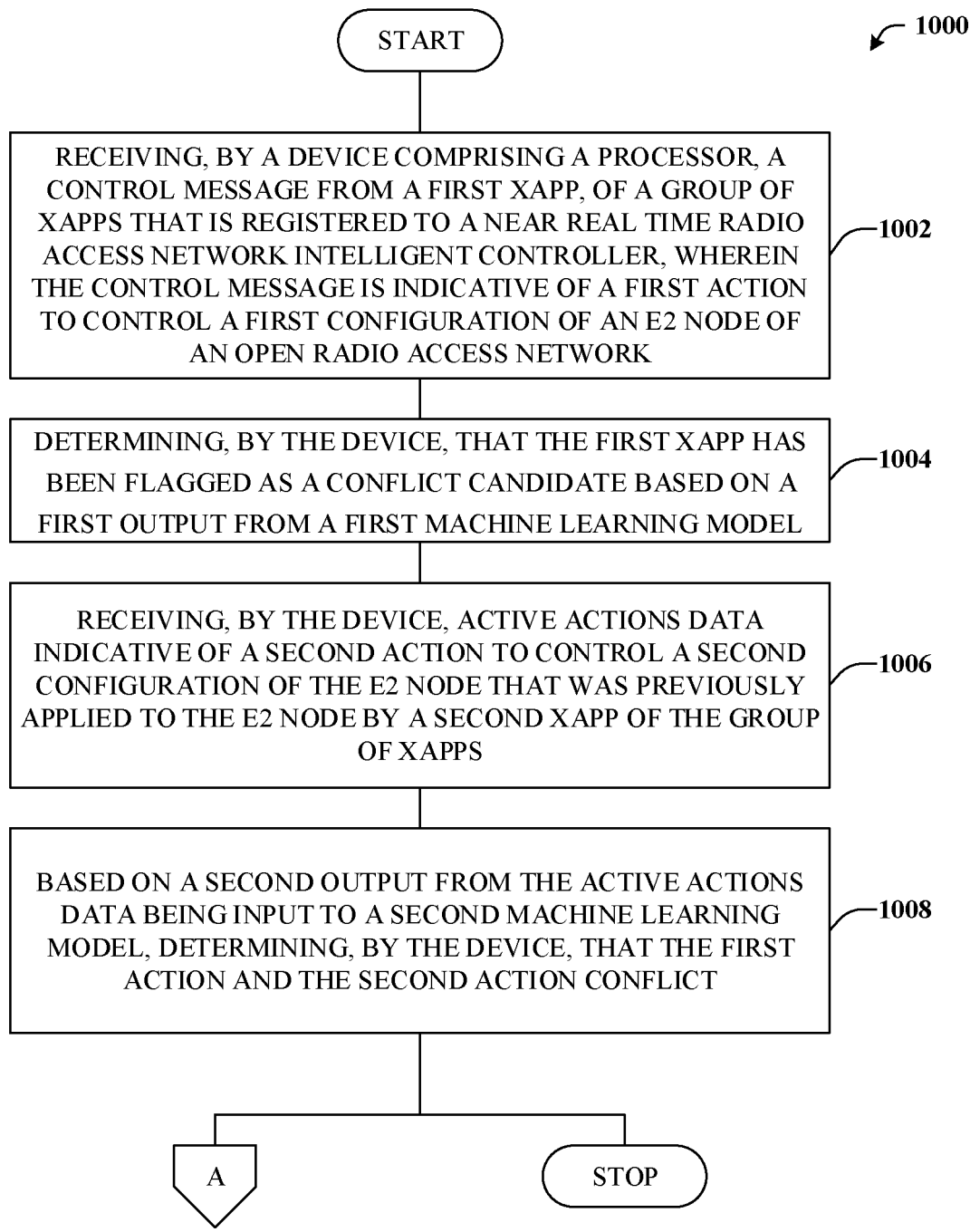
FIG. 10 illustrates an example method that can provide techniques for conflict mitigation between xApps registered to a near-RT RIC in accordance with certain embodiments of this disclosure.
Figure 11:
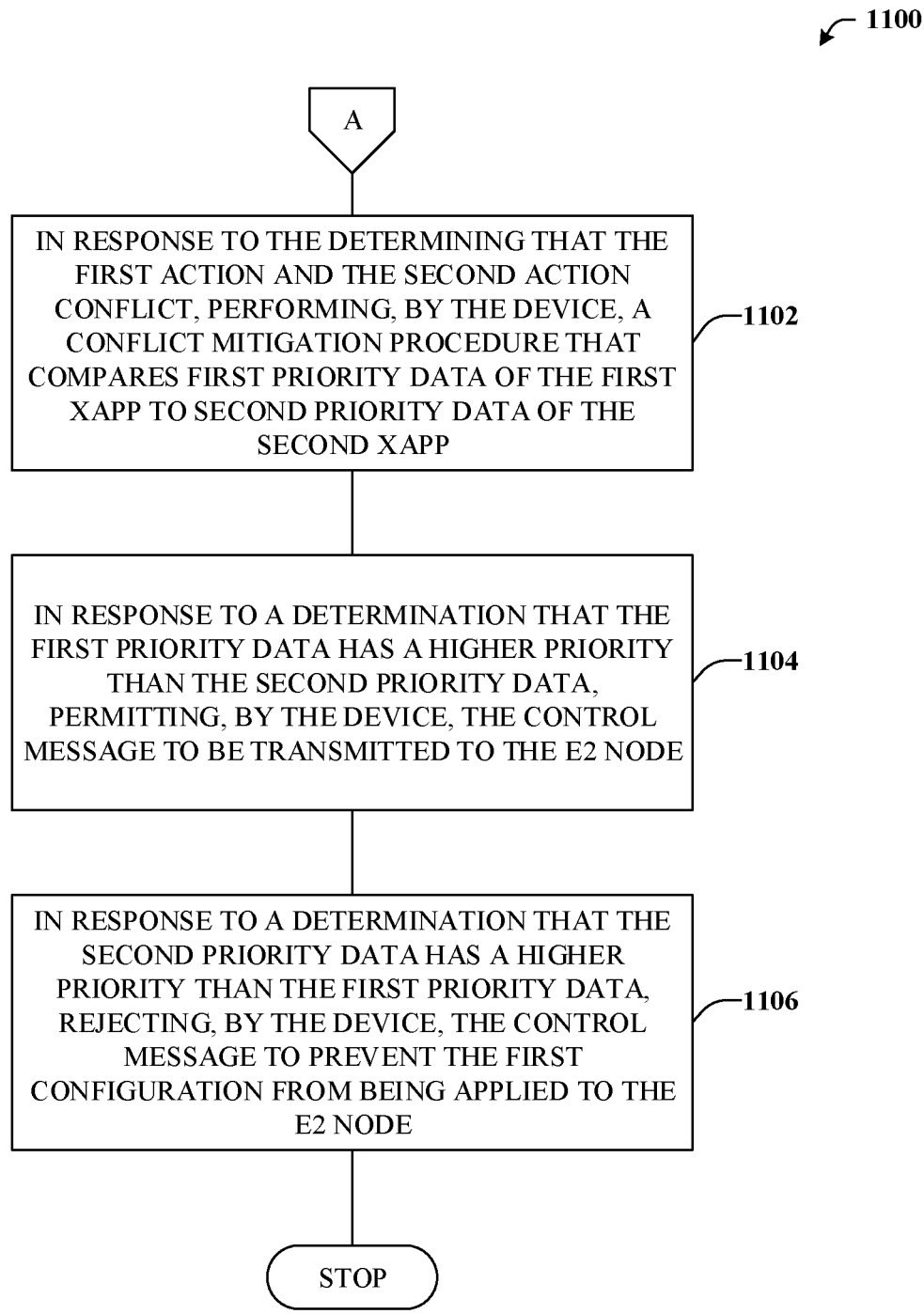
FIG. 11 illustrates an example method that can provide for additional aspect or elements in connection with providing techniques for conflict mitigation between xApps registered to a near-RT RIC in accordance with certain embodiments of this disclosure.

FIGS. 9-11 illustrate various methods in accordance with the disclosed subject matter. While, for purposes of simplicity of explanation, the methods are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a method could alternatively be represented as a series of interrelated states or events, such as in a state diagram. Moreover, not all illustrated acts may be required to implement a method in accordance with the disclosed subject matter. Additionally, it should be further appreciated that the methods disclosed hereinafter and throughout this specification are capable of being stored on an article of manufacture to facilitate transporting and transferring such methods to computers.

Turning now to FIG. 9, exemplary method 900 is depicted. Method 900 can provide conflict mitigation techniques via registration time and run time functions in accordance with certain embodiments of this disclosure. Process flow can be event-based and be triggered in response to certain events, including an xApp registration event 902 that occurs at xApp registration time or an xApp control message submission event 908 that occurs at xApp run time.

In response to xApp registration event 902, method 900 can proceed to decision block 904. At decision block 904, it can be determined whether potential conflicts exist between any other registered xApp. Such can be based on a deep learning ML technique as detailed in connection with first ML model 310 and/or conflict predictor 214. If no, then method 900 loops back to process block 902 to await the next event (e.g., registration event 902 or control message submission event 908) or terminates. If yes, then method 900 proceeds to process block 906. At process block 906 both the newly registered xApp and any potentially conflicting xApp can be flagged in a data store such as data store 208.

In response to xApp control message submission event 908, method 900 can proceed to decision block 910. At decision block 910 it can be determined whether the xApp in question (e.g., a first xApp) is flagged. If no, then method 900 can proceed to process block 918 in which the control message of the first xApp is sent to the E2 node, as no potential conflicts exist. If yes, then method 900 can proceed to decision block 912.

Decision block 912 can determine, based on the current network state, whether conflict exists, e.g., such that a first action of the first xApp and a second action of a second xApp, do in fact conflict. Such can be based on second ML model 408 and/or conflict detector 216 as previously described. If no, then, again, no conflicts exist and method 900 can proceed to process block 918. If yes, then method 900 can proceed to decision block 914.

Decision block 914 can determine whether the first xApp has a higher priority than the second xApp with which the first xApp conflicts. If no, then method 900 can proceed to process block 916 in which the control message of the first xApp is blocked. If yes, then method 900 can proceed to process block 918 in which the control message is delivered to the E2 node. Thereafter, regardless of whether process block 916 or 918 is executed, method 900 can loop back to process block 908 to await the next event (e.g., registration event 902 or control message submission event 908), or terminate.

Referring now to FIG. 10, exemplary method 1000 is depicted. Method 1000 can provide techniques for conflict mitigation between xApps registered to a near-RT RIC in accordance with certain embodiments of this disclosure. While method 1000 describes a complete method, in some embodiments, method 1000 can include one or more elements of method 1100, as illustrated by insert A.

At reference numeral 1002, a device comprising a processor can receive a control message from a first xApp, of a group of xApps that is registered to a near real time radio access network intelligent controller. The control message can be indicative of a first action to control a first configuration of an E2 node of an open radio access network.

At reference numeral 1004, the device can determine that the first xApp has been flagged as a conflict candidate based on a first output from a first machine learning model. In some embodiments, the first machine learning model can determine conflict candidate(s) based on input that is provided during registration of the respective two xApps that were determined to be conflict candidates.

At reference numeral 1006, the device can receive active actions data. Active actions data can be indicative of a second action to control a second configuration of the E2 node that was previously applied to the E2 node by a second xApp of the group of xApps. For example, the second xApp can be indicative of an xApp that was also previously identified as a conflict candidate by the first machine learning model.

At reference numeral 1008, based on the output of a second machine learning model that processes input of the first action and the active actions data, the device can determine that the first action and the second action conflict. Method 1000 can terminate or proceed to insert A, which is further detailed in connection with FIG. 11.

Turning now to FIG. 11, exemplary method 1100 is depicted. Method 1100 can provide for additional aspect or elements in connection with providing techniques for conflict mitigation between xApps registered to a near-RT RIC in accordance with certain embodiments of this disclosure.

At reference numeral 1102, the device introduced at reference numeral 1002 comprising a processor can, in response to the determining that the first action and the second action conflict, perform a conflict mitigation procedure. The conflict mitigation procedure can compare first priority data of the first xApp to second priority data of the second xApp.

At reference numeral 1104, in response to a determination that the first priority data has a higher priority than the second priority data, the device can permit the control message to be transmitted to the E2 node.

Figure 12:
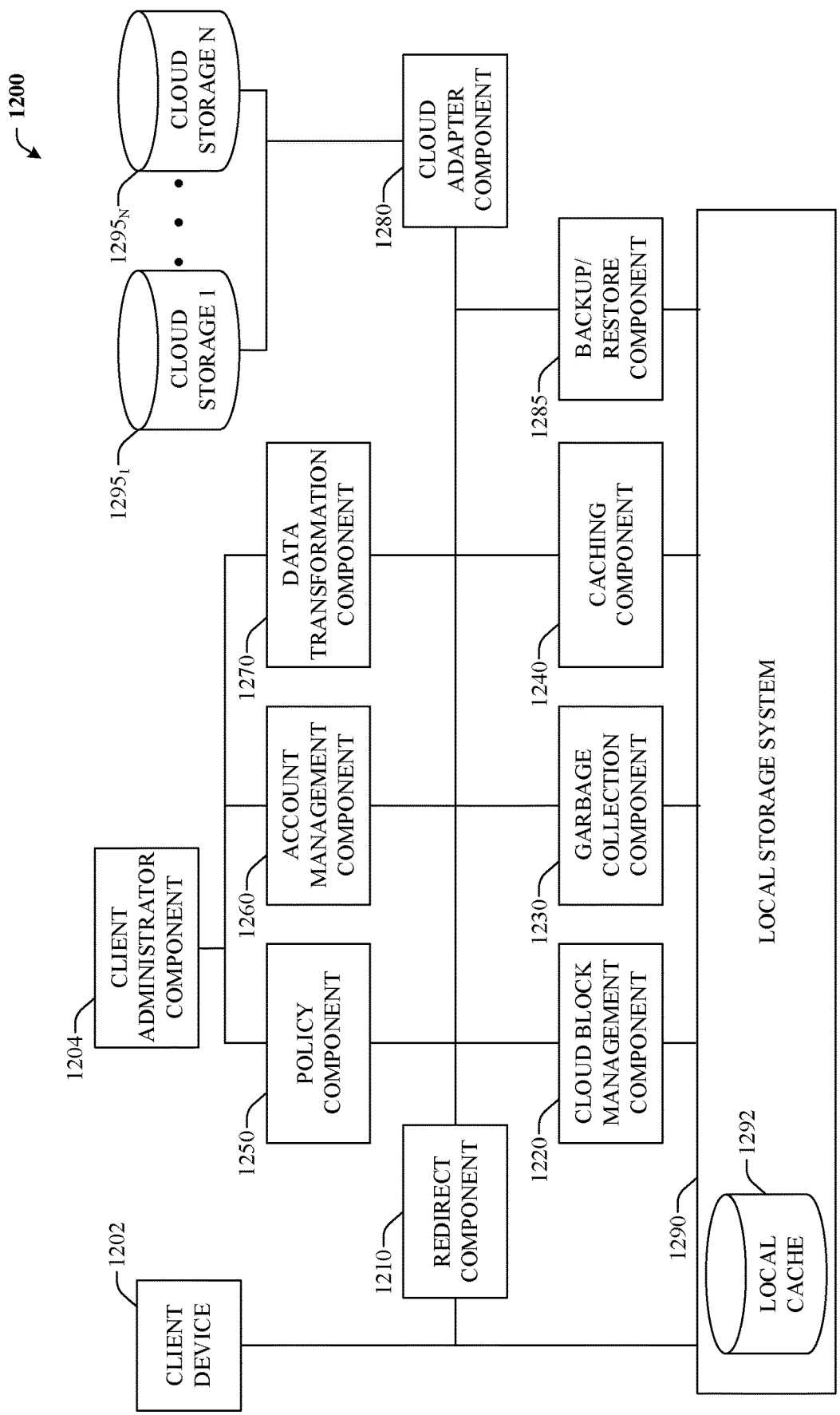
FIG. 12 illustrates a block diagram of an example distributed file storage system that employs tiered cloud storage in accordance with certain embodiments of this disclosure.
Figure 13:
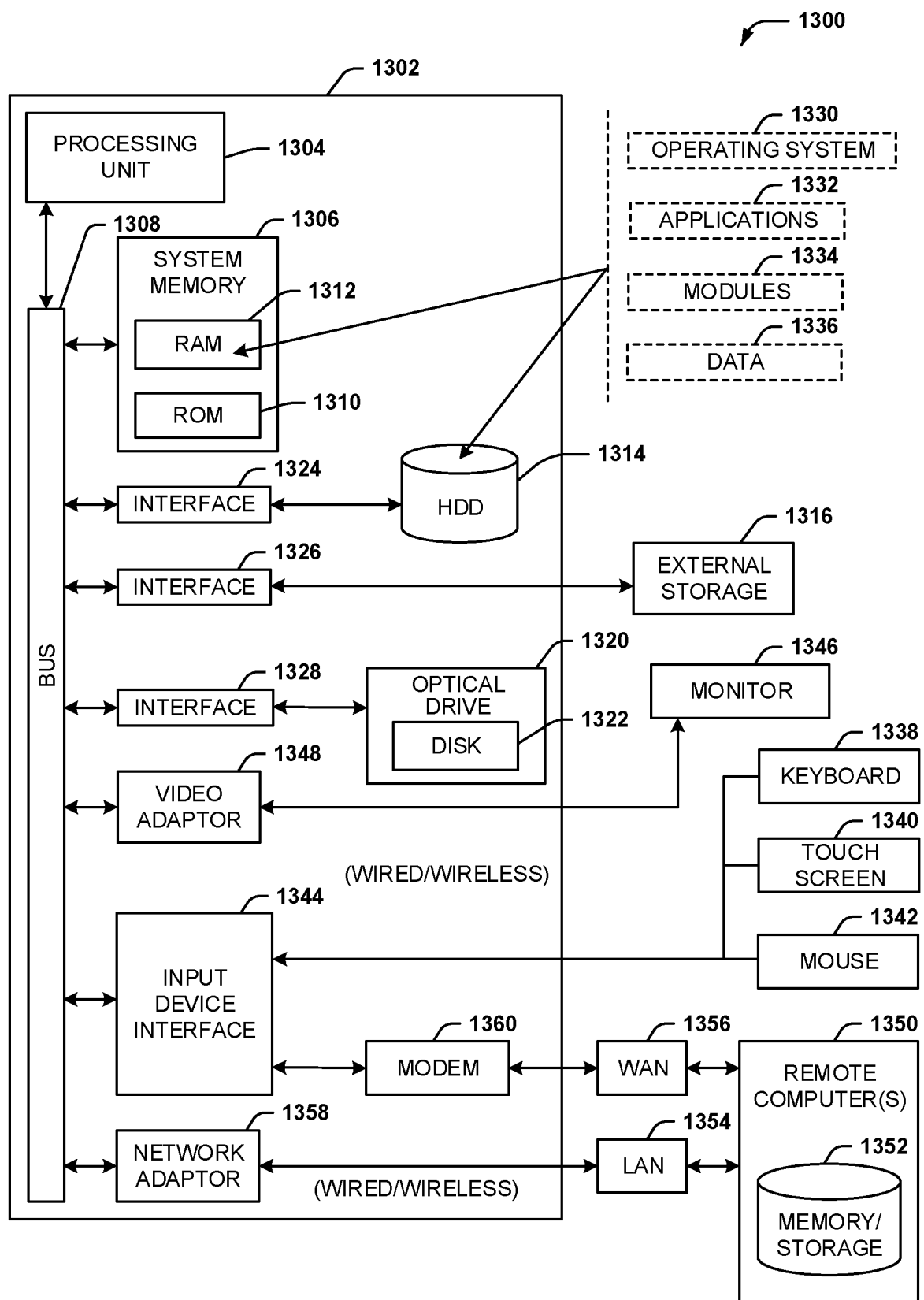
FIG. 13 illustrates an example block diagram of a computer operable to execute certain embodiments of this disclosure.

At reference numeral 1106, in response to a determination that the second priority data has a higher priority than the first priority data, the device can reject the control message to prevent the first configuration from being applied to the E2 node Example Operating Environments To provide further context for various aspects of the subject specification, FIGS. 12 and 13 illustrate, respectively, a block diagram of an example distributed file storage system 1200 that employs tiered cloud storage and block diagram of a computer 1302 operable to execute the disclosed storage architecture in accordance with aspects described herein.

Referring now to FIG. 12, there is illustrated an example local storage system including cloud tiering components and a cloud storage location in accordance with implementations of this disclosure. Client device 1202 can access local storage system 1290. Local storage system 1290 can be a node and cluster storage system such as an EMC Isilon Cluster that operates under OneFS operating system. Local storage system 1290 can also store the local cache 1292 for access by other components. It can be appreciated that the systems and methods described herein can run in tandem with other local storage systems as well.

As more fully described below with respect to redirect component 1210, redirect component 1210 can intercept operations directed to stub files. Cloud block management component 1220, garbage collection component 1230, and caching component 1240 may also be in communication with local storage system 1290 directly as depicted in FIG. 12 or through redirect component 1210. A client administrator component 1204 may use an interface to access the policy component 1250 and the account management component 1260 for operations as more fully described below with respect to these components. Data transformation component 1270 can operate to provide encryption and compression to files tiered to cloud storage. Cloud adapter component 1280 can be in communication with cloud storage 1 $1295_1$ and cloud storage N $1295_N$, where N is a positive integer. It can be appreciated that multiple cloud storage locations can be used for storage including multiple accounts within a single cloud storage location as more fully described in implementations of this disclosure. Further, a backup/restore component 1285 can be utilized to back up the files stored within the local storage system 1290.

Cloud block management component 1220 manages the mapping between stub files and cloud objects, the allocation of cloud objects for stubbing, and locating cloud objects for recall and/or reads and writes. It can be appreciated that as file content data is moved to cloud storage, metadata relating to the file, for example, the complete inode and extended attributes of the file, still are stored locally, as a stub. In one implementation, metadata relating to the file can also be stored in cloud storage for use, for example, in a disaster recovery scenario.

Mapping between a stub file and a set of cloud objects models the link between a local file (e.g., a file location, offset, range, etc.) and a set of cloud objects where individual cloud objects can be defined by at least an account, a container, and an object identifier. The mapping information (e.g., mapinfo) can be stored as an extended attribute directly in the file. It can be appreciated that in some operating system environments, the extended attribute field can have size limitations. For example, in one implementation, the extended attribute for a file is 8 kilobytes. In one implementation, when the mapping information grows larger than the extended attribute field provides, overflow mapping information can be stored in a separate system b-tree. For example, when a stub file is modified in different parts of the file, and the changes are written back in different times, the mapping associated with the file may grow. It can be appreciated that having to reference a set of non-sequential cloud objects that have individual mapping information rather than referencing a set of sequential cloud objects, can increase the size of the mapping information stored. In one implementation, the use of the overflow system b-tree can limit the use of the overflow to large stub files that are modified in different regions of the file.

File content can be mapped by the cloud block management component 1220 in chunks of data. A uniform chunk size can be selected where all files that tiered to cloud storage can be broken down into chunks and stored as individual cloud objects per chunk. It can be appreciated that a large chunk size can reduce the number of objects used to represent a file in cloud storage; however, a large chunk size can decrease the performance of random writes.

The account management component 1260 manages the information for cloud storage accounts. Account information can be populated manually via a user interface provided to a user or administrator of the system. Each account can be associated with account details such as an account name, a cloud storage provider, a uniform resource locator ("URL"), an access key, a creation date, statistics associated with usage of the account, an account capacity, and an amount of available capacity. Statistics associated with usage of the account can be updated by the cloud block management component 1220 based on list of mappings it manages. For example, each stub can be associated with an account, and the cloud block management component 1220 can aggregate information from a set of stubs associated with the same account. Other example statistics that can be maintained include the number of recalls, the number of writes, the number of modifications, and the largest recall by read and write operations, etc. In one implementation, multiple accounts can exist for a single cloud service provider, each with unique account names and access codes.

The cloud adapter component 1280 manages the sending and receiving of data to and from the cloud service providers. The cloud adapter component 1280 can utilize a set of APIs. For example, each cloud service provider may have provider specific API to interact with the provider.

A policy component 1250 enables a set of policies that aid a user of the system to identify files eligible for being tiered to cloud storage. A policy can use criteria such as file name, file path, file size, file attributes including user generated file attributes, last modified time, last access time, last status change, and file ownership. It can be appreciated that other file attributes not given as examples can be used to establish tiering policies, including custom attributes specifically designed for such purpose. In one implementation, a policy can be established based on a file being greater than a file size threshold and the last access time being greater than a time threshold.

In one implementation, a policy can specify the following criteria: stubbing criteria, cloud account priorities, encryption options, compression options, caching and IO access pattern recognition, and retention settings. For example, user selected retention policies can be honored by garbage collection component 1230. In another example, caching policies such as those that direct the amount of data cached for a stub (e.g., full vs. partial cache), a cache expiration period (e.g., a time period where after expiration, data in the cache is no longer valid), a write back settle time (e.g., a time period of delay for further operations on a cache region to guarantee any previous writebacks to cloud storage have settled prior to modifying data in the local cache), a delayed invalidation period (e.g., a time period specifying a delay until a cached region is invalidated thus retaining data for backup or emergency retention), a garbage collection retention period, backup retention periods including short term and long term retention periods, etc.

A garbage collection component 1230 can be used to determine which files/objects/data constructs remaining in both local storage and cloud storage can be deleted. In one implementation, the resources to be managed for garbage collection include CMOs, cloud data objects (CDOs) (e.g., a cloud object containing the actual tiered content data), local cache data, and cache state information.

A caching component 1240 can be used to facilitate efficient caching of data to help reduce the bandwidth cost of repeated reads and writes to the same portion (e.g., chunk or sub-chunk) of a stubbed file, can increase the performance of the write operation, and can increase performance of read operations to portion of a stubbed file accessed repeatedly. As stated above with regards to the cloud block management component 1220, files that are tiered are split into chunks and in some implementations, sub chunks. Thus, a stub file or a secondary data structure can be maintained to store states of each chunk or sub-chunk of a stubbed file. States (e.g., stored in the stub as cacheinfo) can include a cached data state meaning that an exact copy of the data in cloud storage is stored in local cache storage, a non-cached state meaning that the data for a chunk or over a range of chunks and/or sub chunks is not cached and therefore the data has to be obtained from the cloud storage provider, a modified state or dirty state meaning that the data in the range has been modified, but the modified data has not yet been synced to cloud storage, a sync-in-progress state that indicates that the dirty data within the cache is in the process of being synced back to the cloud and a truncated state meaning that the data in the range has been explicitly truncated by a user. In one implementation, a fully cached state can be flagged in the stub associated with the file signifying that all data associated with the stub is present in local storage. This flag can occur outside the cache tracking tree in the stub file (e.g., stored in the stub file as cacheinfo), and can allow, in one example, reads to be directly served locally without looking to the cache tracking tree.

The caching component 1240 can be used to perform at least the following seven operations: cache initialization, cache destruction, removing cached data, adding existing file information to the cache, adding new file information to the cache, reading information from the cache, updating existing file information to the cache, and truncating the cache due to a file operation. It can be appreciated that besides the initialization and destruction of the cache, the remaining five operations can be represented by four basic file system operations: Fill, Write, Clear and Sync. For example, removing cached data is represented by clear, adding existing file information to the cache by fill, adding new information to the cache by write, reading information from the cache by read following a fill, updating existing file information to the cache by fill followed by a write, and truncating cache due to file operation by sync and then a partial clear.

In one implementation, the caching component 1240 can track any operations performed on the cache. For example, any operation touching the cache can be added to a queue prior to the corresponding operation being performed on the cache. For example, before a fill operation, an entry is placed on an invalidate queue as the file and/or regions of the file will be transitioning from an uncached state to cached state. In another example, before a write operation, an entry is placed on a synchronization list as the file and/or regions of the file will be transitioning from cached to cached-dirty. A flag can be associated with the file and/or regions of the file to show that it has been placed in a queue and the flag can be cleared upon successfully completing the queue process.

In one implementation, a time stamp can be utilized for an operation along with a custom settle time depending on the operations. The settle time can instruct the system how long to wait before allowing a second operation on a file and/or file region. For example, if the file is written to cache and a write back entry is also received, by using settle times, the write back can be re-queued rather than processed if the operation is attempted to be performed prior to the expiration of the settle time.

In one implementation, a cache tracking file can be generated and associated with a stub file at the time it is tiered to the cloud. The cache tracking file can track locks on the entire file and/or regions of the file and the cache state of regions of the file. In one implementation, the cache tracking file is stored in an Alternate Data Stream ("ADS"). It can be appreciated that ADS are based on the New Technology File System ("NTFS") ADS. In one implementation, the cache tracking tree tracks file regions of the stub file, cached states associated with regions of the stub file, a set of cache flags, a version, a file size, a region size, a data offset, a last region, and a range map.

In one implementation, a cache fill operation can be processed by the following steps: (1) an exclusive lock on can be activated on the cache tracking tree; (2) it can be verified whether the regions to be filled are dirty; (3) the exclusive lock on the cache tracking tree can be downgraded to a shared lock; (4) a shared lock can be activated for the cache region; (5) data can be read from the cloud into the cache region; (6) update the cache state for the cache region to cached; and (7) locks can be released.

In one implementation, a cache read operation can be processed by the following steps: (1) a shared lock on the cache tracking tree can be activated; (2) a shared lock on the cache region for the read can be activated; (3) the cache tracking tree can be used to verify that the cache state for the cache region is not "not cached;" (4) data can be read from the cache region; (5) the shared lock on the cache region can be deactivated; (6) the shared lock on the cache tracking tree can be deactivated.

In one implementation, a cache write operation can be processed by the following steps: (1) an exclusive lock on can be activated on the cache tracking tree; (2) the file can be added to the synch queue; (3) if the file size of the write is greater than the current file size, the cache range for the file can be extended; (4) the exclusive lock on the cache tracking tree can be downgraded to a shared lock; (5) an exclusive lock can be activated on the cache region; (6) if the cache tracking tree marks the cache region as "not cached" the region can be filled; (7) the cache tracking tree can updated to mark the cache region as dirty; (8) the data can be written to the cache region; (9) the lock can be deactivated.

In one implementation, data can be cached at the time of a first read. For example, if the state associated with the data range called for in a read operation is non-cached, then this would be deemed a first read, and the data can be retrieved from the cloud storage provider and stored into local cache. In one implementation, a policy can be established for populating the cache with range of data based on how frequently the data range is read; thus, increasing the likelihood that a read request will be associated with a data range in a cached data state. It can be appreciated that limits on the size of the cache, and the amount of data in the cache can be limiting factors in the amount of data populated in the cache via policy.

A data transformation component 1270 can encrypt and/or compress data that is tiered to cloud storage. In relation to encryption, it can be appreciated that when data is stored in off-premises cloud storage and/or public cloud storage, users can require data encryption to ensure data is not disclosed to an illegitimate third party. In one implementation, data can be encrypted locally before storing/writing the data to cloud storage.

In one implementation, the backup/restore component 1285 can transfer a copy of the files within the local storage system 1290 to another cluster (e.g., target cluster). Further, the backup/restore component 1285 can manage synchronization between the local storage system 1290 and the other cluster, such that, the other cluster is timely updated with new and/or modified content within the local storage system 1290.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enable with a security module, such as a trusted processing module (TPM). For instance with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 1102.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 5 GHz radio band at a 54 Mbps (802.11a) data rate, and/or a 2.4 GHz radio band at an 11 Mbps (802.11b), a 54 Mbps (802.11g) data rate, or up to a 600 Mbps (802.11n) data rate for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A device, comprising:
a processor; and
a memory that stores executable instructions that, when executed by the processor, facilitate performance of operations, comprising:
receiving, from a first xApp, of a group of xApps that is registered to a near real time radio access network intelligent controller, a control message that is indicative of a first action to control a first parameter of an E2 node of an open radio access network;
in response to a determination that the first xApp has been flagged as a conflict candidate according to a first process performed by a conflict predictor of the near real time radio access network intelligent controller that is separate from the group of xApps using a first machine learning model that executes in response to registration of the first xApp, receiving active actions data indicative of a second action to control a second parameter of the E2 node that was previously applied to the E2 node by a second xApp of the group of xApps; and
based on the active actions data, determining, according to a second process performed by a conflict detector of the near real time radio access network intelligent controller that is separate from the group of xApps using a second machine learning model that executes during run-time of the first xApp and the second xApp, that the first action and the second action conflict.

2. The device of claim 1, wherein the active actions data is received from a data store of the near real time radio access network intelligent controller, the data store configured to store:
flag data indicative of conflict candidates, comprising the conflict candidate, determined using the first machine learning model from among the group of xApps registered to the near real time radio access network intelligent controller;
history data indicative of actions, comprising the second action, that have been applied to the E2 node;
parameter data indicative of parameters, comprising the first parameter and the second parameter, controlled by the group of xApps;
category data indicative of a category of a member of the group of xApps; or
priority data indicative of a priority of the member of the group of xApps.

3. The device of claim 2, wherein the operations further comprise:
receiving the category data and the priority data in response to a registration procedure performed on the member of the group of xApps to register the member to the near real time radio access network intelligent controller; and
storing the category data and the priority data to the data store.

4. The device of claim 3, wherein the registration procedure further comprises determining the parameter data and storing the parameter data to the data store.

5. The device of claim 3, wherein the operations further comprise determining the flag data and storing the flag data to the data store.

6. The device of claim 5, wherein the flag data is determined in response to inputting various portions of the parameter data and the category data to the first machine learning model.

7. The device of claim 2, wherein the operations further comprise filtering the history data based on a configurable time window since an action of the actions was applied to the E2 node.

8. The device of claim 2, wherein the operations further comprise filtering the conflict candidates by conflict pairing data indicative of xApps of the group of xApps that were determined to potentially conflict with the first xApp.

9. The device of claim 1, wherein the first action and the second action are determined to conflict based at least in part on a result of inputting the first action and the active actions data to the second machine learning model.

10. The device of claim 1, wherein the operations further comprise, in response to a determination that the first action and the second action conflict, performing a conflict mitigation procedure.

11. The device of claim 10, wherein the conflict mitigation procedure prevents the control message from being delivered to the E2 node in response to a determination that the priority data indicates the second xApp has a higher priority than the first xApp.

12. The device of claim 10, wherein the conflict mitigation procedure instructs the E2 node to be configured according to the control message in response to a determination that the priority data indicates the first xApp has a higher priority than the second xApp.

13. A non-transitory computer-readable medium comprising instructions that, in response to execution, cause a system comprising a processor to perform operations, comprising:
receiving, from a first xApp, of a group of xApps that is registered to a near real time radio access network intelligent controller, a control message that is indicative of a first action to control a first parameter of an E2 node of an open radio access network;
in response to a determination that the first xApp has been flagged as a conflict candidate according to a first machine learning model executed in response to registration of the first xApp via a conflict predictor of the near real time radio access network intelligent controller that is separate from the group of xApps, receiving active actions data indicative of a second action to control a second parameter of the E2 node that was previously applied to the E2 node by a second xApp of the group of xApps;
based on the active actions data, determining, according to a second machine learning model executed during run-time of the first xApp and the second xApp by a conflict detector of the near real time radio access network intelligent controller that is separate from the group of xApps, that the first action and the second action conflict; and
based on a comparison of first priority data assigned to the first xApp and second priority data assigned to the second xApp, determining whether to transmit the control message to the E2 node.

14. The non-transitory computer-readable medium of claim 13, wherein the active actions data is received from a data store of the near real time radio access network intelligent controller, the data store configured to store:
flag data indicative of conflict candidates, comprising the conflict candidate, determined according to the first machine learning model from among the group of xApps registered to the near real time radio access network intelligent controller;
history data indicative of actions, comprising the second action, that have been applied to the E2 node;
parameter data indicative of parameters, comprising the first parameter and the second parameter, controlled by a member of the group of xApps;
category data indicative of a category of the member of the group of xApps; or
priority data, comprising the first priority data and the second priority data, that is indicative of a priority of the member of the group of xApps.

15. The non-transitory computer-readable medium of claim 14, wherein the operations further comprise:
receiving the category data and the priority data in response to a registration procedure performed on the member of the group of xApps to register the member to the near real time radio access network intelligent controller, and
storing the category data and the priority data to the data store.

16. The non-transitory computer-readable medium of claim 14, wherein the operations further comprise determining the flag data and storing the flag data to the data store, and wherein the flag data is determined in response to inputting various portions of the parameter data and the category data to the first machine learning model.

17. A method, comprising:
receiving, by a device comprising a processor, a control message from a first xApp, of a group of xApps that is registered to a near real time radio access network intelligent controller, wherein the control message is indicative of a first action to control a first configuration of an E2 node of an open radio access network;
determining, by the device, that the first xApp has been flagged as a conflict candidate based on a first output from a first machine learning model that is executed, via a conflict predictor of the near real time radio access network intelligent controller that is separate from the group of xApps, in response to registration of the first xApp via;
receiving, by the device, active actions data indicative of a second action to control a second configuration of the E2 node that was previously applied to the E2 node by a second xApp of the group of xApps; and
based on a second output from the active actions data being input to a second machine learning model, determining, by the device, that the first action and the second action conflict, wherein the second machine learning model is executed, via a conflict detector of the near real time radio access network intelligent controller that is separate from the group of xApps, during run-time of the first xApp and the second xApp.

18. The method of claim 17, further comprising, in response to the determining that the first action and the second action conflict, performing, by the device, a conflict mitigation procedure that compares first priority data of the first xApp to second priority data of the second xApp.

19. The method of claim 18, further comprising, in response to a determination that the first priority data has a higher priority than the second priority data, permitting, by the device, the control message to be transmitted to the E2 node.

20. The method of claim 18, further comprising, in response to a determination that the second priority data has a higher priority than the first priority data, rejecting, by the device, the control message to prevent the first configuration from being applied to the E2 node.

* * * * *